United States Patent [19]

Ban et al.

[11] Patent Number: 4,583,016
[45] Date of Patent: Apr. 15, 1986

[54] DIRECT CURRENT MOTOR

[76] Inventors: Itsuki Ban, 829, Higashi-Oizumimachi, Nerima-ku, Tokyo; Manabu Shiraki, 4451-171 Shimotsuruma, Yamato-shi, Kanagawa-kon; Kazuhito Egami, 2-44-1 Chuo, Nakano-ku, Tokyo, all of Japan

[21] Appl. No.: 634,872

[22] Filed: Jul. 26, 1984

Related U.S. Application Data

[63] Continuation-in-part of Ser. No. 506,843, Jun. 28, 1983, abandoned, which is a continuation-in-part of Ser. No. 280,477, Jul. 6, 1981, abandoned.

[51] Int. Cl.⁴ ................................................ H02K 3/00
[52] U.S. Cl. .................................. 310/198; 310/46; 310/154; 310/207
[58] Field of Search ........... 310/40 MM, 90, 198–208, 310/46, 154, 234, 68 R, 266, 268; 318/439

[56] References Cited

U.S. PATENT DOCUMENTS

| | | | |
|---|---|---|---|
| Re. 30,761 | 10/1981 | Ban et al. | 318/439 |
| 3,532,916 | 10/1970 | Fisher | 310/266 |
| 3,699,371 | 10/1972 | Henry-Baudot | 310/207 |
| 3,737,697 | 6/1973 | Kitamori et al. | 310/207 |
| 4,197,495 | 4/1980 | Ban et al. | 310/203 |
| 4,227,107 | 10/1980 | Ban et al. | 310/234 |
| 4,243,902 | 1/1981 | Ban et al. | 310/207 |
| 4,315,177 | 2/1982 | Ban et al. | 310/154 |
| 4,404,485 | 9/1983 | Ban et al. | 310/198 |

FOREIGN PATENT DOCUMENTS

| | | |
|---|---|---|
| 2240717 | 3/1973 | Fed. Rep. of Germany ... 310/DIG. 3 |
| 0027505 | 3/1977 | Japan .................................. 310/234 |

*Primary Examiner*—R. Skudy
*Attorney, Agent, or Firm*—Pahl, Lorusso & Loud

[57] ABSTRACT

A direct current motor comprising a field magnet with 2np magnetic poles, magnetized to N and S poles with equal angular intervals, where n is an integer of 1 or more and p is an integer of 2 or more; a magnetic member for closing the magnetic circuit of the magnetic circuit of the magnetic poles of the field magnet; $n(py\pm1)$ armature coils disposed in such a manner that the angular intervals of the electrically conductive portions of the armature coils, contributing to the generation of torque in the armature coils, are substantially equal to the magnetic pole width of the field magnet, where y is an integer of 3 or more; a wave-winding-type armature on which the armature coils are disposed, overlapping on each other, with an equal pitch, the wave-winding-type armature being directed towards the field magnet within the magnetic circuit; electric power supply control device for commutating the commutator current $np(py\pm1)$ times or $2np(py\pm1)$ times per one rotation of the armature coils; and a rotating shaft for rotatably supporting the wave-winding-type armature or the field magnet, the rotating shaft being rotatably supported by bearings mounted on an outer casing of the motor.

2 Claims, 25 Drawing Figures

DIRECT CURRENT MOTOR

REFERENCE TO RELATED APPLICATION

This application is a continuation-in-part of U.S. patent application Ser. No. 506,843 which was filed on June 28, 1983, now abandoned, and which was a continuation-in-part of U.S. patent application Ser. No. 280,477 (now abandoned) which was filed on July 6, 1981.

BACKGROUND OF THE INVENTION

The present invention relates to a direct current motor and particularly to a direct current motor improved with respect to commutating characteristics, provided with a field magnet having 2np magnetic poles (n being an integer of 1 or more and p being an interger of 2 or more) and a disc-shaped or cylindrical armature comprising n (py±1) armature coils (y being an integer of 3 or more but 4 or more when p=2), with the lapping of the armature coils minimized.

It is well known that a direct current (DC) motor, provided with a plurality of armature coils formed in a lap-winding manner or a wave-winding manner is highly efficient and has better commutating characteristics as the number of armature coils increases. However, if the conventional manner of lap winding or wave winding is employed in a coreless motor, the armature will increase in thickness because the armature coils are superimposed on each other in many layers. The increased thickness of the armature will substantially reduce the effective magnetic field of the field magnet which passes through the armature, resulting in decreased magnetic field, motor efficiency and starting torque. In order to solve these problems, the prior art effort has been directed to decreasing the thickness of the electrically conductive portions contributing to the generation of torque. The process for decreasing the thickness of the electrically conductive portions is performed by press molding, and accordingly is often accompanied by such defects as breaking and short-circuiting of the armature coils. Further, since the phase relationship between the armature cannot be positively held in the desired state at the time the coils are arranged, correct phase relationship between the armature coils is liable to be distorted. Accordingly, such prior art DC motors are costly and cannot be mass produced.

Another prior art technique used for conventional cylindrical coreless DC motors, for avoiding superimposition of the opposite edge portions of the armature coils on each other, requires that the insulated wire be wound in alignment, so that a cylindrical armature is formed, with the entire width of winding, or a part thereof slanting with respect to the rotating axis. This technique however, also is costly and cannot be used for mass-production.

SUMMARY OF THE INVENTION

The above-described drawbacks in the prior art motors have been successfully eliminated by the present invention.

In order to attain the above-mentioned object, according to the present invention, there is provided a DC motor in which the conventional wave-winding-type armature coils formed in a wave-winding manner are developed and n(py±1) armature coils are arranged relative to the magnetic field of a field magnet having 2np magnetic poles in a predetermined manner as will be described in detail, so that commutating or current-changing of armature current during one rotation of the magnet or the armature is performed np(py±1) times or 2nd (py±1) times, where n is an integer of 1 or more, p is an integer of 2 or more and y is an integer of 3 or more but 4 or more when p=2. As a result, the number of lapped armature coils is reduced and the armature is made thinner without any special processing, thereby providing a DC motor with improved commutating characteristics, having high torque generation and high efficiency.

These and other objects of the present invention will become apparent from the following description of embodiments thereof when taken together with the drawings.

BRIEF DESCRIPTION OF THE DRAWINGS

In the drawings

FIGS. 7(a) and 7(b), 8 and 9 are explanatory views of examples of field magnet armatures for use in an armature motor;

DETAILED DESCRIPTION OF THE PREFERRED EMBODIMENTS

Figure 1:
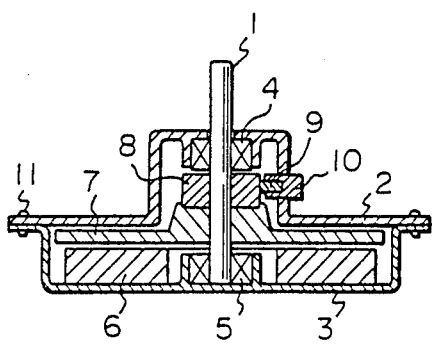
FIG. 1 a sectional view of a commutator motor according to the present invention.

FIG. 1 is a sectional view of a commutator motor with a disc-shaped commutator. In the figure, a bearing 5 is fixed to a casing 3 made of press-formed soft steel. Further, a casing 2 made of press-formed soft steel is secured to the casing 3 by screws 11, forming a magnetic circuit therebetween. A bearing 4 is fixed to the casing 2. A rotating shaft 1 is supported by the bearings 4 and 5. One end of the rotating shaft 1 is in pressure contact with the casing 3. A cylindrical field magnet 6, magnetized with magnetic poles N and S located in the axial direction of the rotating shaft 1, is secured to the casing 3. To the rotating shaft 1, there are fixed an armature 7 and a commutator 8 which are molded integrally. The armature 7 is located in a field air gap between the casing 2 and the field magnet 6. Reference numeral 10 indicates a brush support for supporting brushes 9 which are in contact with the commutator 8, which serves as electic power supply control means for the armature 7.

Figure 2:
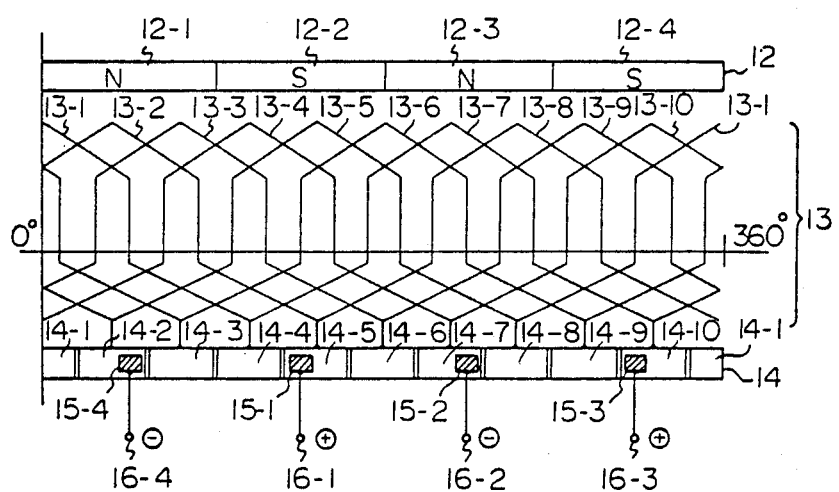
FIG. 2 is an expanded view of a conventional field magnet and a conventional wave-winding-type armature.

Referring to FIG. 2, there is shown an expanded view of a conventional DC motor comprising a field magnet 12 with 4 magnetic poles and 10 armature coils. The field magnet 12 comprises magnetic poles 12-1, 12-2, 12-3 and 12-4, magnetized alternately to N and S poles with 90-degree angular intervals. The armature is of a cross-connection-normal-double winding type, and the angular intervals of the electrically conductive portion contributing to the generation of torque in each armature coil are set equal to the magnetic pole width. Armature coils, 13-1, 13-2 . . . , 13-10 are fixed with 36-degree angular intervals (2/5 the magnetic pole width). As shown in the figure, in the case where the armature coils are fixed by the conventional fixing means, they are fixed to the armature in multiple layers. Due to this construction it is difficult to arrange the terminals of the armature coils in the proper order and to manufacture the motor with such construction.

When integrally molded armature coils are arranged on the armature, the armature will increase in thickness because the armature coils are superimposed on each other in many layers. The increased thickness of the armature will substantially reduce the effective magnetic field of the field magnet which passes through the armature, resulting in decreased magnetic field, motor efficiency and starting torque. A communtator 14 comprises commutator segments 14-1, 14-2, . . . , and 14-10, with 36-degree angular intervals (2/5 the magnetic pole width). As mentioned previously, since the armature is of a double winding type, there are disposed two pairs of brushes. To brushes 15-1 and 15-2 is supplied power, respectively, from DC power source positive pole 16-1 and DC power source negative pole 16-2, while to brushes 15-3 and 15-4 is supplied power, respectively from DC power source positive pole 16-3 and DC power source negative pole 16-4. The angular intervals of the brushes is 90 degrees, which are equal to the magnetic pole width.

Referring to FIGS. 3(a) and 3(b), FIG. 4 and FIGS. 5(a) to 5(b), commutator motors to which the present invention is applied will now be explained. Each of these commutator motors is provided with the previously mentioned disc-shaped armature and a field magnet with 4 (=2np) magnetic poles (where n is an integer of 1 or more, and p is an integer of 2 or more, and in these commutator motors, n=1, p=2, thus, 2np=4).

Figure 3A:
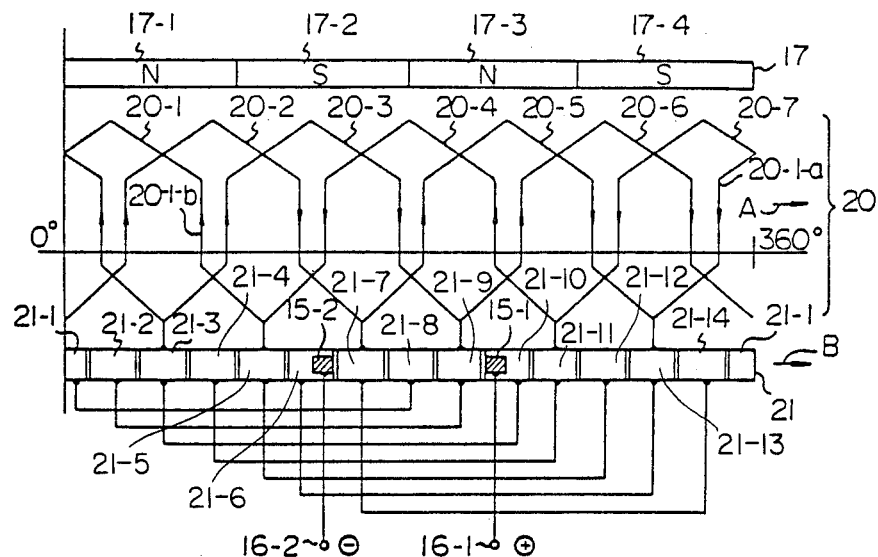
FIGS. 3(a), 3(b) and 4 are expanded views of examples of the field magnets and armatures for use in the motors according to the invention.
Figure 5A:
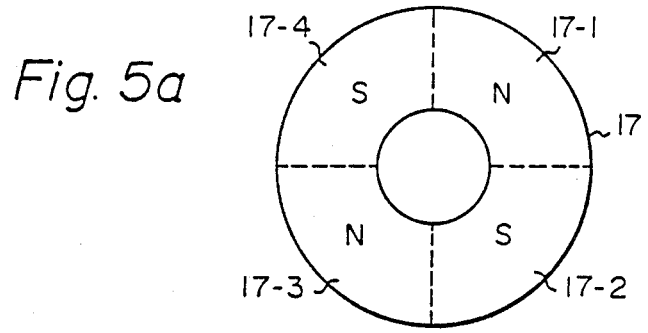
FIG. 5(a) is an explanatory view of each field magnet shown in FIGS. 3(a), 3(b), and FIG. 4.
Figure 5B:
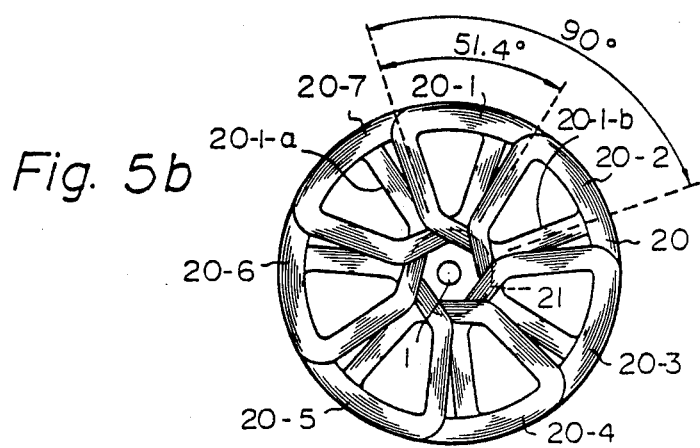
FIG. 5(b) is explanatory view of the armatures shown in FIGS. 3(a) and 3(b), and FIG. 4, respectively.

Specifically, referring to FIG. 3(a), there is shown an expanded view of a commutator motor provided with a field magnet with 4 (=2np, where n=1, p=2) magnetic poles and 7 (=n(py+1)) armature coils, where n=1, p=2 and y=3 (generally y is an integer of 3 or more but 4 or more when p=2). As shown in FIG. 5(a), a field magnet 17 has magnetic poles 17-1, 17-2, 17-3 and 17-4, magnetized alternately to N and S with 90-degree angular intervals in the axial direction of the rotating shaft, which field magnet 17 corresponds to the field magnet 6 as shown in FIG. 1. A commutator 21, which serves as electrical power supply control means comprises 14 (=np (py+1)) commutator segments 21-1, 21-2, . . . , 21-14 disposed with about 25.7-degree angular intervals (2/7 the magnetic pole width). Each 2 (=np) separately disposed commutator segments which lie at the angular intervals (two times the magnetic pole width) are electically connected to each other. The commutator segment 21-1 is connected to the commutator segment 21-8 through a conductor. Likewise, the commutator segment 21-2 is connected to the commuator segment 21-9, and the commutator segment 21-3 to the commutator 21-10, the commutator segment 21-4 to the commutator segment 21-11, the commutator segment 21-5 to the commutator segment 21-12, the commutator segment 21-6 to the commutator segment 21-13, and the commutator segment 21-7 to the commutator segment 21-14 through conductors. As shown in FIG. 5(b) the armature 20 comprises armature coils 20-1, 20-2, . . . , and 20-7 which are arranged with an equal pitch, partly overlapping on each other, with about 51.2-degree angular intervals (4/7 the magnetic pole width). The angular intervals of the conductive portions which contribute to the generation of torque in the armature coils (in the case of the armature coil 20-1, its conductive portions are 20-1-a and 20-1-b) are 90 degrees and equal to the magnetic pole width. The armature 20 corresponds to the armature 7 shown in FIG. 1.

Referring back to FIG. 3(a), each armature coil is subjected to wave-winding connection and the respective connecting portions of the armature coils 20-1 and 20-4, the armature coils 20-4 and 20-7, the armature coils 20-7 and 20-3, the armature coils 20-3 and 20-6, the armature coils 20-6 and 20-2, the armature coils 20-2 and 20-5, and of the armature coils 20-5 and 20-1 are connected to commutator segments 21-5, 21-11, 21-3, 21-9, 21-1, 21-7 and 21-13. The angular intervals of brushes 15-1 and 15-2 are equal to the magnetic pole width (360/2np=90 degrees). Those angular intervals are equivalent to 270-degree angular intervals. In the configuration shown in FIG. 3(a), when electric current flows in the direction of the arrow and torque is generated in each armature coil, so that the armature 20 and the commutator 21 are rotated in the directions of the arrow A and the arrow B, respectively.

Thus, the switching of the armature current (that is, commutating) is done 28 (=2np(py−1)) times per one rotation (except the specific point) and the motor is rotated by successive generation of torque.

Figure 3B:
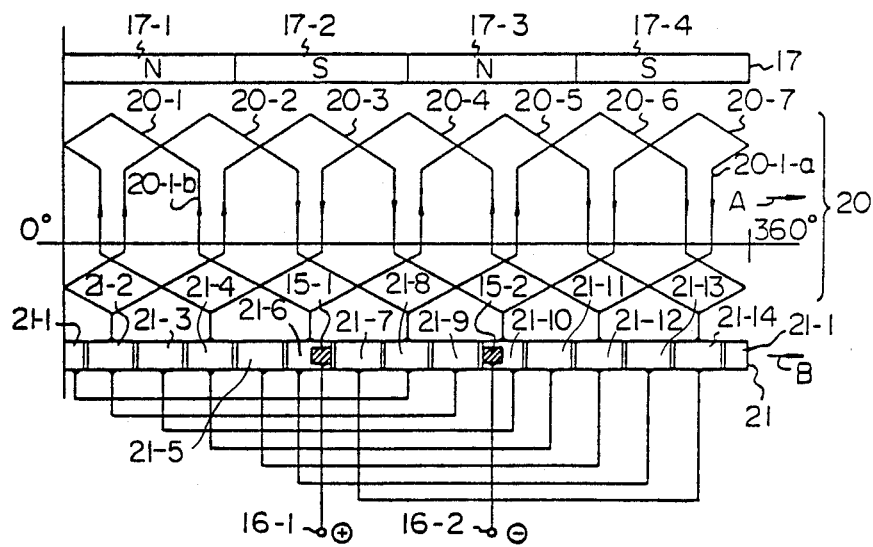

Referring to FIG. 3(b), there is shown an expanded view of a further commutator motor provided with 7 (n=(py−1)) armature coils, where n=1, p=2, and y=4. In the motor as shown in FIG. 3(b), only the connection of the commutator segments to each other and the connection of the commutator segments to the counterpart armature coils are different from the connections in the motor shown in FIG. 3(a). Each armature coil in the motor in FIG. 3(b) is subjected to different wave winding from that employed in the motor as shown in FIG. 3(a) and the respective connecting portions of the armature coils 20-1 and 20-5, the armature coils 20-5 and 20-2, the armature coils 20-2 and 20-6, the armature coils 20-6 and 20-3, the armature coils 20-3 and 20-7, the armature coils 20-7 and 20-4, and of the armature coils 20-4 and 20-1 are connected to commutator segments 21-6, 21-14, 21-8, 21-2, 11-10, 21-4 and 21-12. As described above as to FIG. 3(b) in contrast to FIG. 3(a), when y=3, the number of armature coils is 7 (=n(py+1)), and when y=4, the number of armature coils is also 7 (=n(py−1)). Thus, the number of armatures is the same. When p=2, even if the connection of the commutator segments to the counterpart armature coils are different, the characteristics of the motors are the same.

Figure 4:
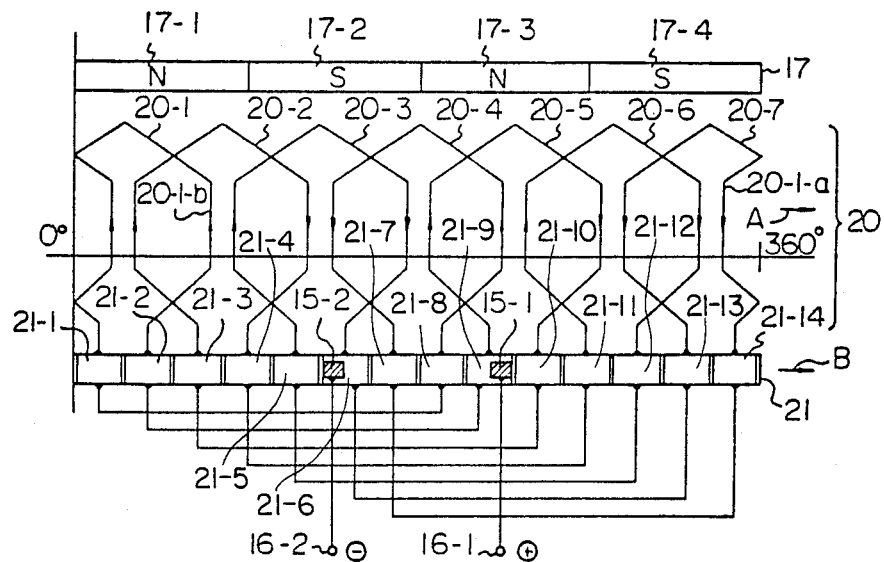

Referring to FIG. 4, there is shown an expanded view of a further commutator motor in which the connection of commutator segments to their corresponding armature coils is different from those in the armature motors as shown in FIG. 3(a) and FIG. 3(b). However, the characteristics of the commutator motor shown in FIG. 3(c) are the same as those of the commutator motors as shown in FIG. 3(a) and FIG. 3(b). In the commutator motor shown in FIG. 4, one end of the armature coil 20-1 is connected to the commutator segment 21-1 and the other end of the same is connected to the commutator segment 21-2. Likewise, one end of the armature coil 20-2 is connected to the commutator segment 21-3 and the other end of the same is connected to the commutator segment 21-4, and one end of the armature coil 20-3 is connected to the commutator segment 21-5 and the other end of the same is connected to the commutator segment 21-6, and one end of the armature coil 20-4 is connected to the commutator segment 21-7 and the other end of the same is connected to the commutator segment 21-8, and one end of the armature coil 20-5 is connected to the commutator segment 21-9 and the other end of the same is connected to the commutator segment 21-10, and one end of the armature coil 20-6 is connected to the commutator segment 21-11 and the other end of the same is connected to the commutator segment 21-12, and one end of the armature coil 20-7 is connected to the commutator segment 21-13 and the other end of the same is connected to the commutator segment 21-14.

Figure 6:
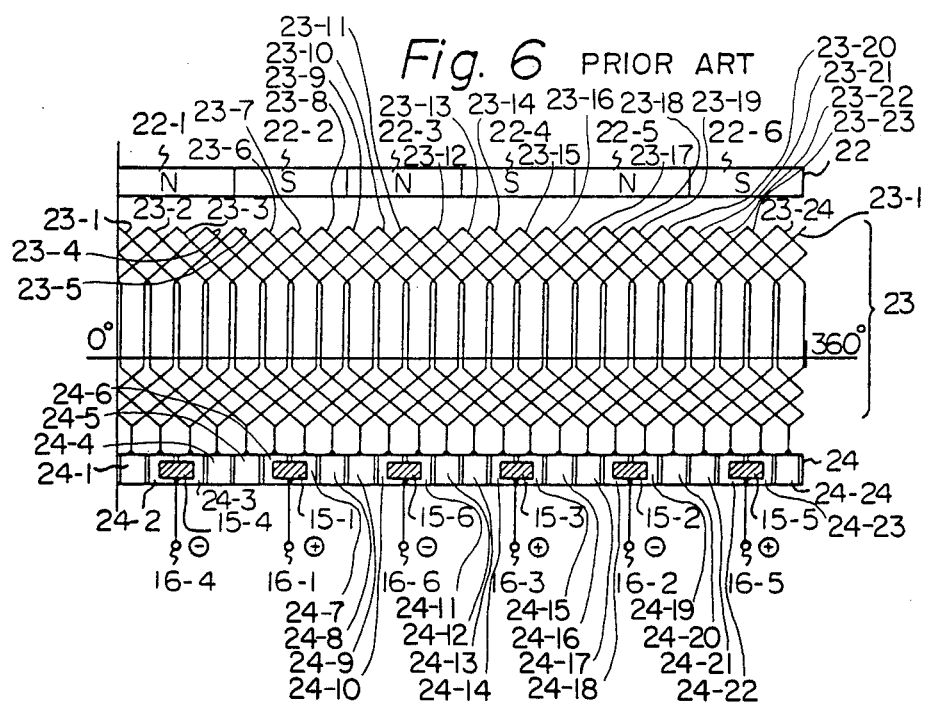
FIG. 6 is an expanded view of a conventional field magnet and a conventional wave-winding-type armature.

Referring to FIG. 6, there is shown an expanded view of a conventional commutator motor provided with a field magnet with 6 magnetic poles and a wave-winding-type armature with 24 armature coils. The field magnet 22 comprises magnetic poles 22-1, 22-2, ..., and 22-6, magnetized alternately to N and S with 60 degree angular intervals. The armature is of a cross-connection-normal-triple winding type, and the angular intervals of the electically conductive portion contributing to the generation of torque in each armature coils are set equal to the magnetic pole width. Armature coils, 23-1, 23-2, ..., 23-24 are disposed with 15 degree angular intervals (¼ the magnetic pole width). As mentioned above, since the armature 24 is of the triple-winding-type, there are three pairs of brushes and to the brushes 15-1 and 15-2 is suppled power from the DC power source positive and negative poles 16-1 and 16-2, respectively, while to the brushes 15-3 and 15-4 is supplied power from the DC power source positive and negative poles 16-3 and 16-4, respectively and to the brushes 15-5 and 15-6 is supplied power from the DC power source positive and negative poles 16-5 and 16-6, respectively, Those brushes are disposed with 60-degree angular intervals (equal to the magnetic pole width).

Referring to FIGS. 7(a) to 7(c), 8, 9 and 10(a) to 10(d), commutator motors to which the present invention is applied will now be explained. These commutator motors are provided with the previously mentioned disc-shaped armature and a field magnet with 6 (=2np) magnetic poles (in these commutator motors, n=1, p=3).

Figure 7A:
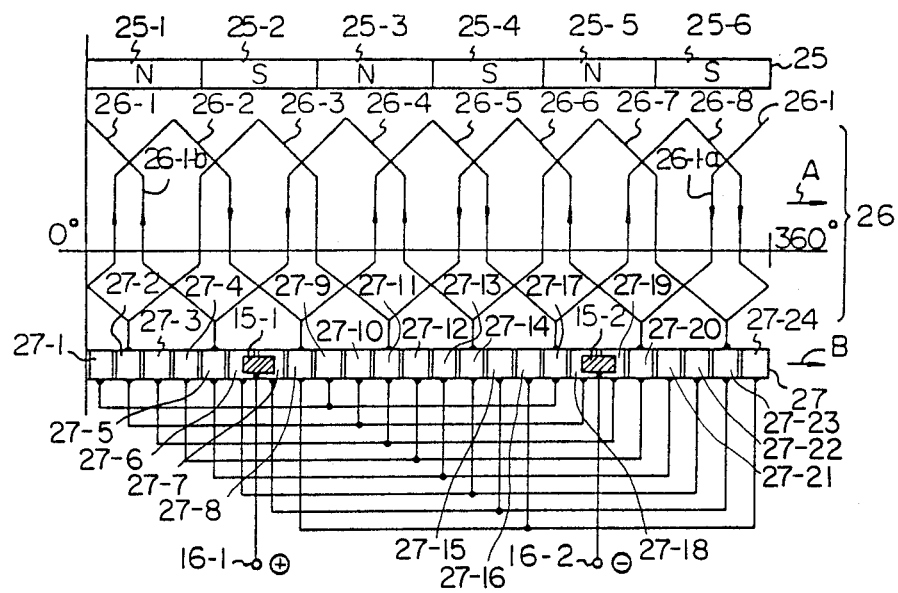
FIG. 7(a) is an explanatory view of the field magnet for use in the examples in FIGS. 2 to 6.
Figure 10A:
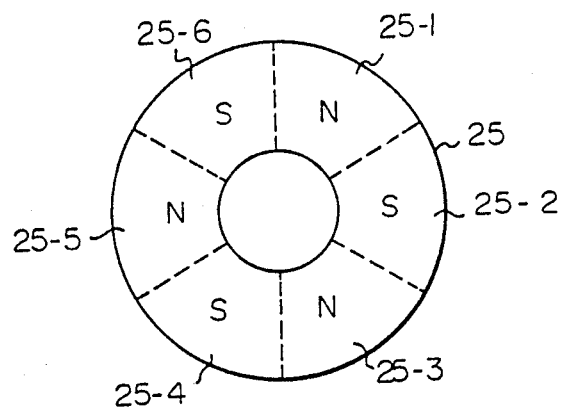
FIG. 10(a) is an explanatory view of the field magnet for use in the examples in FIGS. 7(a) 7(b), 8 and 9.
Figure 10B:
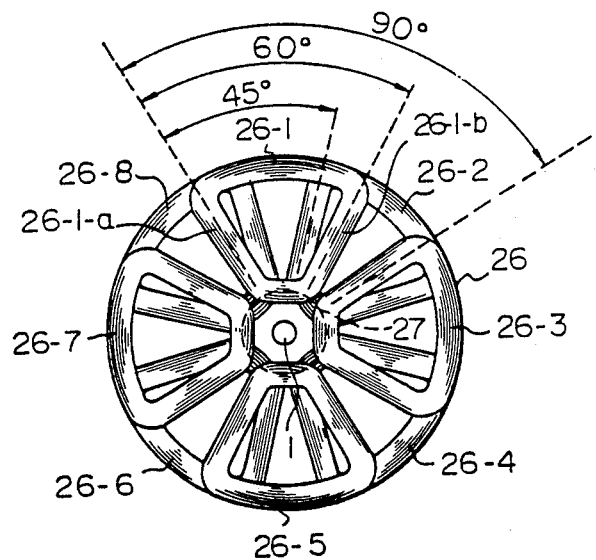
FIG. 10(b), 10(c), and 10(d) are respectively explanatory views of armatures for use in the examples in FIGS. 7(a), 7(b), 8 and 9.

Specifically, referring to FIG. 7(a), there is shown an expanded view of a commutator motor provided with a field magnet with 6 (=2np) magnetic poles and 8 (=n(py−1)) armature coils, where n=1, p=3 and y=3. As shown in FIG. 10(a). a field magnet 25 has magnetic poles 25-1, 25-2, ..., and 25-6, magnetized alternately to N and S with 60-degree angular intervals in the axial direction of the rotating shaft, which field magnet 25 corresponds to the field magnet 6 as shown in FIG. 1. A commutator 27 comprises 24 (=np(py−1)) commutator segments, 27-1,27-2, ..., 27-24, which are disposed with 15-degree angular intervals (¼ the magnetic pole width), and each 3 (=np) separately disposed commutator segments which lie at 120-degree (=360 degrees/np) angular intervals (which is two times the magnetic pole width) are electrically connected to each other. Specifically, the commutator segments 27-1, 27-9 and 27-17 are connected to each other through a conductor. Likewise, the commutator segments 27-2, 27-10 and 27-18 are connected to each other; the commutator segments 27-3, 27-11 and 27-19 are connected to each other; the commutator segments 27-4, 27-12 and 27-20 are connected to each other; the commutator segments 27-5, 27-13 and 27-21 are connected to each other; the commutator segments 27-6, 27-14 and 27-22 are connected to each other; the commutator segments 27-7, 27-15 and 27-23 are connected to each other; and the commutator segments 27-8, 27-16 and 27-24 are connected to each other. As shown in FIG. 10(b), the armature 26 comprises armature coils 26-1, 26-3, 26-5 and 26-7, which are arranged side by side on a disc-shaped armature, with an equal pitch of 90 degree angular intervals (3/2 the magnetic pole width). The angular intervals of the conductive portions which contribute to the generation of torque in the armature coils (in the case of the armature coil 26-1, its conductive portions are 26-1-a and 26-1-b) are 60 degrees and equal to the magnetic pole width. The four armature coils are disposed adjacent to each other. The armature coils 26-2, 26-4, 26-6 and 26-8 are arranged side by side on the lower surface of the disc-shaped armature with the same angular intervals as mentioned above. The upper armature coils and the lower armature coils are double layered with a phase shift of 45 degrees, forming a disc-shaped armature, which corresponds to the armature 7 as shown in FIG. 1.

Referring back to FIG. 7(a), each armature coil is subjected to wave-winding connection and the respective connecting portions of the armature coils 26-1 and 26-4, the armature coils 26-4 and 26-7, the armature coils 26-7 and 26-2, the armature coils 26-2 and 26-5, the armature coils 26-5 and 26-8, the armature coils 26-8 and 26-3, the armature coils 26-3 and 26-6, and of the armature coils 26-6 and 26-1 are connected to commutator segments 27-5, 27-14, 27-23, 27-8, 27-17, 27-2, 27-11 and 27-20 in such a manner that they do not overlap in multiple layers, with the armature coils 27-2, 27-3, 27-5, 27-6, 27-8, 27-9, 27-11, 27-12, 27-14, 27-15, 27-17, 27-18, 27-20, 27-21, 27-23 and 27-24 shown in FIG. 6 eliminated therefrom. The angular intervals of brushes 15-1 and 15-2 are 180 degrees (3/1 the magnetic pole width). Those angular intervals are equivalent to 60-degree (=360/2np) angular intervals (equal to the magnetic pole width) and to 300-degree angular intervals.

In the configuration shown in FIG. 6, when electric current flows in the direction of the arrow and torque is generated in each armature coil, the armature 26 and the commutator 27 are rotated in the directions of the arrow A and the arrow B, respectively.

Thus, the switching of the armature current (that is, commutating) is done 24 (=np(py−1)) times per one rotation (except the specific point) and the motor is rotated by successive generation of torque.

Figure 7B:
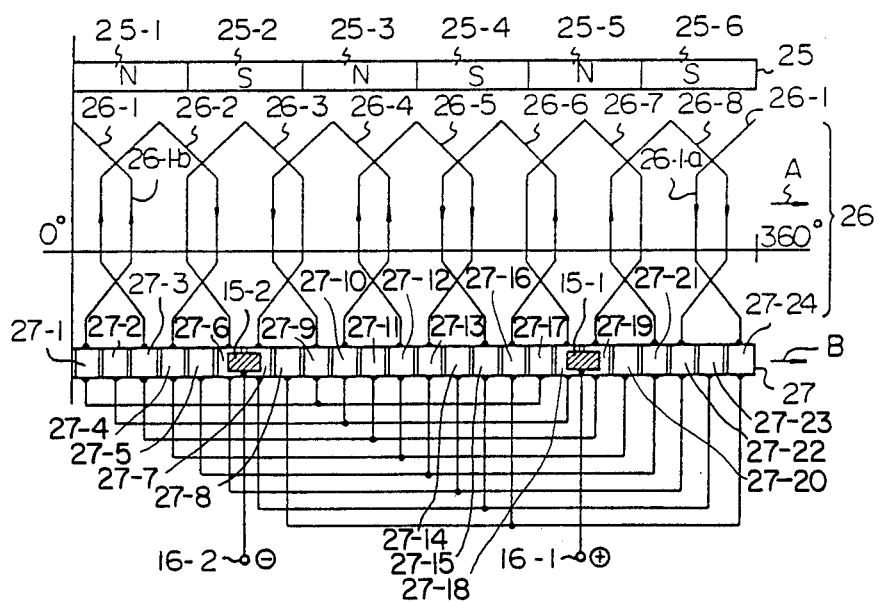

In the motor as shown in FIG. 7(b), only the connection of the commutator segments to the counterpart armature coil is different from the connection of the commutator segments to the counterpart armature coil in the motor shown in FIG. 7(a). However, the characteristics of the motor shown in FIG. 7(b) are the same as those of the motor shown in FIG. 7(a). One end of the armature coil 26-1 is connected to the commutator segment 27-24 and the other end of the same is connected to the commutator segment 27-1. Likewise, one end of the armature coil 26-2 is connected to the commutator segment 27-3, and the other end of the same is connected to the commutator segment 27-4, and one end of the armature coil 26-3 is connected to the commutator segment 27-6, and the other end of the same is connected to the commutator segment 27-7, and one end of the armature coil 26-4 is connected to the commutator segment 27-9, and the other end of the same is connected to the commutator segment 27-10, and one end of the armature coil 26-5 is connected to the commutator segment 27-12, and the other end of the same is connected to the commutator segment 27-13, and one end of the armature coil 26-6 is connected to the commutator segment 27-15, and the other end of the same is connected to the commutator segment 27-16, and one end of the armature coil 26-7 is connected to the commutator segment 27-18, and the other end of the same is connected to the commutator segment 27-19, and one end of the armature coil 26-8 is connected to the commutator segment 27-21 and the other end of the same is connected to the commutator segment 27-22.

As described above as to FIG. 4. in contrast to FIGS. 3(a) and 3(b), and FIG. 7(b) in contrast FIG. 7(a), when only the connection of the armature coils to the counterpart commutator segments is different, the characteristics of the motors are the same. The same is true of the embodiments of a DC motor according to the present invention. Therefore, only one example of the connection of the commutator segments to the counterpart armature coils will hereafter be explained with respect to each embodiment.

Figure 8:
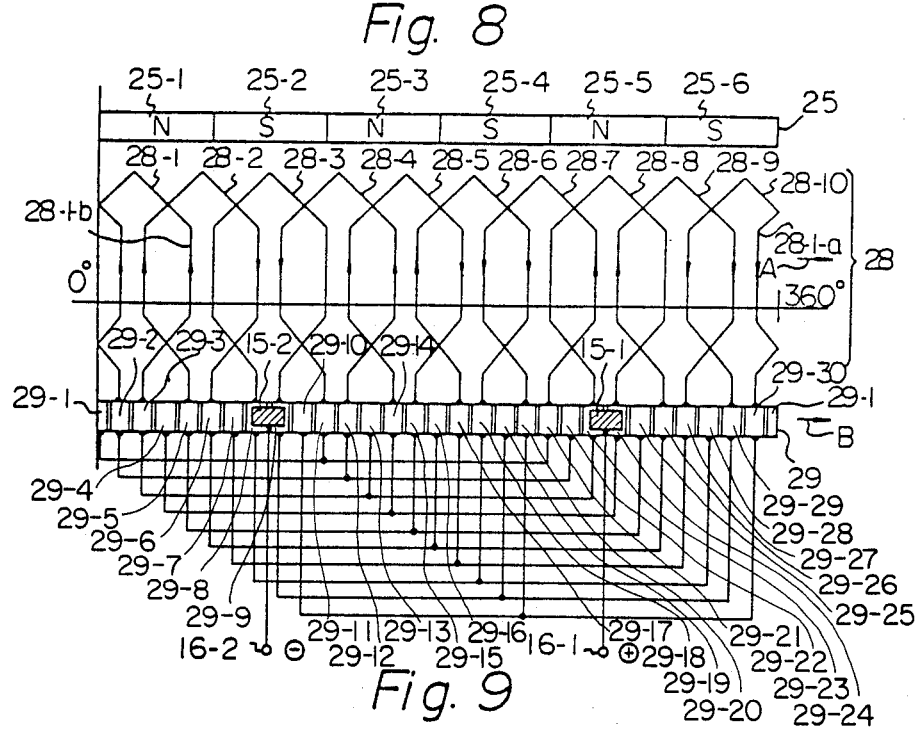
Figure 10C:
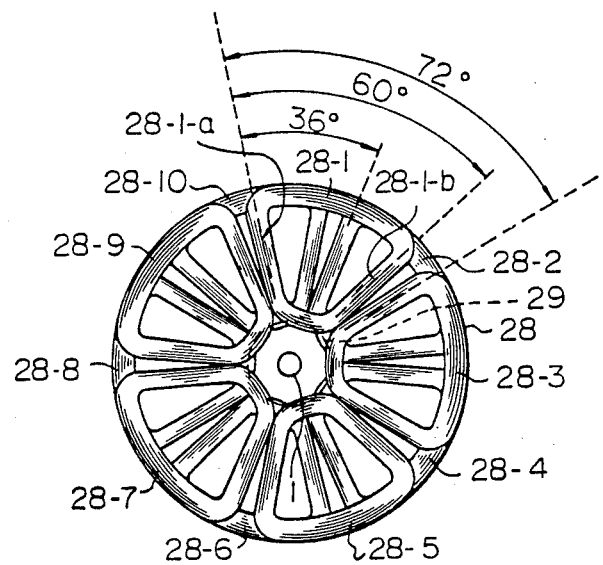

Referring to FIG. 8, there is shown an expanded view of a commutator motor provided with a field magnet with 6 (=2np) magnetic poles and 10 (=n(py+1)) armature coils, where n=1, p=3 and y=3. A commutator 29 comprises 20 (=np(py+1)) commutator segments, 29-1, 29-2, ..., 29-30, which are disposed with 12-degree angular intervals (1/5 the magnetic pole width), and each 3 (=np) separately disposed commutator segments which lie at 120-degree (=360 degrees/np) angular intervals (which is two times the magnetic pole width) are electrically connected to each other. Specifically, the commutator segments 29-1, 29-11 and 29-21 are connected to each other through a conductor. Likewise, the commutator segments 29-2, 29-12 and 29-22 are connected to each other; the commutator segments 29-3, 29-13 and 29-23 are connected to each other; the commutator segments 29-4, 29-14 and 29-24 are connected to each other; the commutator segments 29-5, 29-15 and 29-25 are connected to each other; the commutator segments 29-6, 29-16 and 29-26 are connected to each other; the commutator segments 29-7, 29-17 and 29-27 are conntected to each other; the commutator segments 29-8, 29-18 and 29-28 are connected to each other; the commutator segments 29-9, 29-19 and 29-29 are connected to each other; and the commutator segments 29-10, 29-20 and 29-30 are connected to each other. As shown in FIG. 10(c), the armature 28 comprises armature coils 28-1, 28-3, 28-5, 28-7, and 28-9, which are arranged side by side on a disc-shaped armature, with an equal pitch of 72-degree angular intervals (6/5 the magnetic pole width). The angular intervals of the conductive portions which contribute to the generation of torque in the armature coils (in the case of the armature coil 28-1, its conductive portions are 28-1-a and 28-1-b) are 60 degrees and equal to the magnetic pole width. The five armature coils are disposed adjacent to each other. The armature coils 28-2, 28-4, 28-6, 28-8 and 28-10 are arranged side by side on the lower surface of the disc-shaped armature with the same angular intervals as mentioned above. The upper armature coils and the lower armature coils are double layered with a phase shift of 36 degrees, forming a disc-shaped armature, which corresponds to the armature 7 as shown in FIG. 1.

Referring back to FIG. 8, one end of the armature coils 28-1 is connected to the commutator segment 29-2 and the other end of the same is connected to the commutator segment 29-3. Likewise, one end of the armature coil 28-2 is connected to the commutator segment 29-5 and the other end of the same is connected to the commutator segment 29-6, and one end of the armature coil 28-3 is connected to the commutator segment 29-8 and the other end of the same is connected to the commutator segment 29-9, and one end of the armature coil 28-4 is connected to the commutator segment 29-11 and the other end of the same is connected to the commutator segment 29-12, and one end of the armature coil 28-5 is connected to the commutator segment 29-14 and the other end of the same is connected to the commutator segment 29-15, and one end of the armature coil 28-6 is connected to the commutator segment 29-17 and the other end of the same is connected to the commutator segment 29-18, and one end of the armature coil 28-7 is connected to the commutator segment 29-20 and the other end of the same is connected to the commutator segment 29-21, and one end of the armature coil 28-8 is connected to the commutator segment 29-23 and the other end of the same is connected to the commutator segment 29-24, and one end of the armature coil 28-9 is connected to the commutator segment 29-26 and the other end of the same is connected to the commutator segment 29-27, and one end of the armature coil 28-10 is connected to the commutator segment 29-29 and the other end of the same is connected to the commutator segment 29-30. The angular intervals of brushes 15-1 and 15-2 are 180 degrees (3/1 the magnetic pole width). Those angular intervals are equivalent to 60-degree (=360/2np) angular intervals (equal to the magnetic pole width) and to 300-degree angular intervals.

In the configuration shown in FIG. 8, when electric current flows in the direction of the arrow and torque is generated in each armature coil, the armature 28 and the commutator 29 are rotated in the directions of the arrow A and the arrow B, respectively.

Thus, the switching of the armature current (that is, commutating) is done 30 (=np(py+1)) times per one rotation (except the specific point) and the motor is rotated by successive generation of torque.

Figure 9:
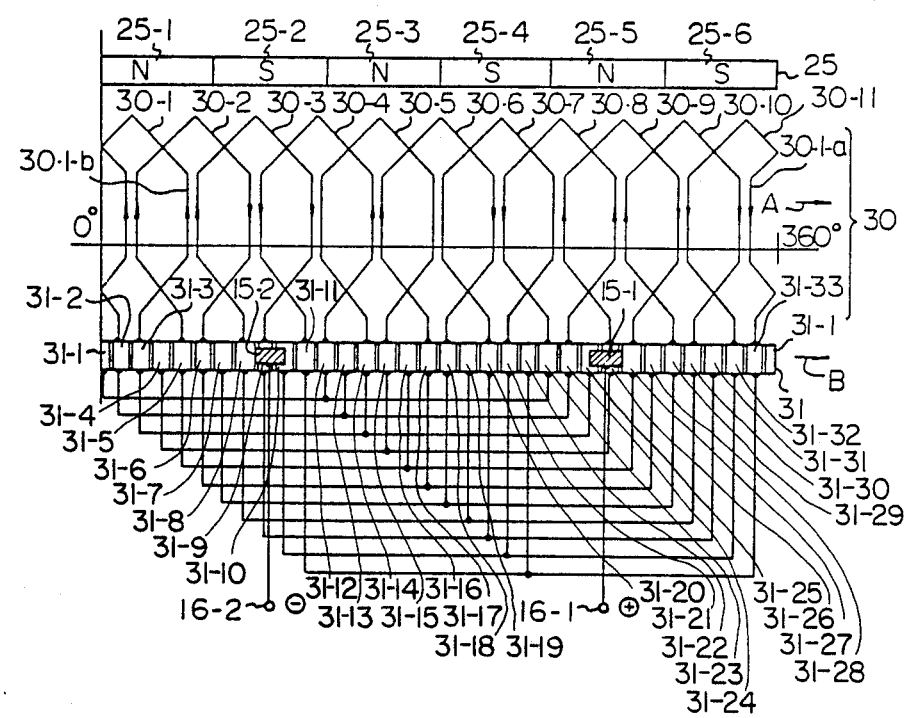

Referring to FIG. 9, there is shown an expanded view of a commutator motor provided with a field magnet with 6 (=2np) magnetic poles and 11 (=n(py−1)) armature coils, where n=1 p =3 and y=4. A commutator 33 comprises 31 (=np(py−1)) commutator segments, 31-1, 31-2, ... , 31-33, which are disposed with about 10.9-degree angular intervals (2/11 the magnetic pole width), and each 3 (=np) separately disposed commutator segments which lie at 120-degree (=360 degrees/np) angular intervals) which is two times the magnetic pole width) are electrically connected to each other. Specifically, the commutator segments 31-1, 31-12 and 31-23 are connected to each other through a conductor. Likewise, the commutator segments 31-2, 31-13 and 31-24 are connected to each other; the commutator segments 31-3, 31-14 and 31-25 are connected to each other; the commutator segments 31-4, 31-15 and 31-26 are connected to each other; the commutator segments 31-5, 31-16 and 31-27 are connected to each other; the commutator segments 31-6, 31-17 and 31-28 are connected to each other; the commutator segments 31-7, 31-18 and 31-29 are connected to each other; the commutator segments 31-8, 31-19 and 31-30 are connected to each other; the commutator segments 31-9, 31-20 and 31-31 are connected to each other; the commutator segments 31-10, 31-21 and 31-32 are connected to each other; the commutator segments 31-10, 31-21 and 31-32 are connected to each other; and the commutator segments 31-11, 31-22 and 31-33 are connected to each other.

Figure 10D:
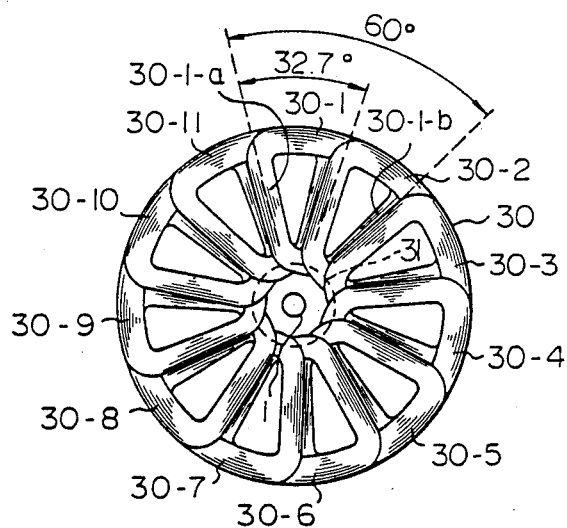

As shown in FIG. 10(d), the armature 30 comprises armature coils 30-1, 30-2, ... and 30-11 which are arranged with an equal pitch, partly overlapping on each other, with about 32.7 degree angular intervals (6/11 the magnetic pole width). The angular intervals of the conductive portions which contribute to the generation of torque in the armature coils (in the case of the armature coil 30-1, its conductive portions are 30-1-a and 30-1-b) are 60 degrees and equal to the magnetic pole width. The armature 30 corresponds to the armature 7 shown in FIG. 1.

Referring back to FIG. 9, one end of the armatrue coil 30-1 is connected to the commutator segment 31-2 and the other end of the same is connected to the commutator segment 31-3. Likewise, one end of the armature coil 30-2 is connected to the commutator segment 31-5 and the other end of the same is connected to the commutator segment 31-6, and one end of the armature coil 30-3 is connected to the commutator segment 31-8 and the other end of the same is connected to the commutator segment 31-9, and one end of the armature coil 30-4 is connected to the commutator segment 31-11 and the other end of the same is connected to the commutator segment 31-12, and one end of the armature coil 30-5 is connected to the commutator segment 31-14 and the other end of the same is connected to the commutator segment 31-15, and one end of the armature coil 30-6 is connected to the commutator segment 31-17 and the other end of the same is connected to the commutator segment 31-18, and one end of the armature coil 30-7 is connected to the commutator segment 31-20 and the other end of the same is connected to the commutator segment 31-21, and one end of the armature coil 30-8 is connected to the commutator segment 31-23 and the other end of the same is connected to the commutator segment 31-24, and one end of the armature coil 30-9 is connected to the commutator segment 31-26 and the other end of the same is connected to the commutator segment 31-27, and one end of the armature coil 30-10 is connected to the commutator segment 31-29 and the other end of the same is connected to the commutator segment 31-30, and one end of the armature coil 30-11 is connected to the commutator segment 31-32 and the other end of the same is connected to the commutator segment 31-33. The angular intervals of brushes 15-1 and 15-2 are 180 degrees (3/1 the magnetic pole width). Those angular intervals are equivalent to 60-degree (=360/2np) angular intervals (equal to the magnetic pole width) and to 300-degree angular intervals.

In the configuration shown in FIG. 9, when electric current flows in the direction of the arrow and torque is generated in each armature coil, the armature 30 and the commutator 31 are rotated in the directions of the arrow A and the arrow B, respectively.

Thus the switching of the armature current (that is, commutating) is done 66 (=2np(py−1)) times per one rotation (except the specific point) and the motor is rotated with successive generation of torque.

Figure 11:
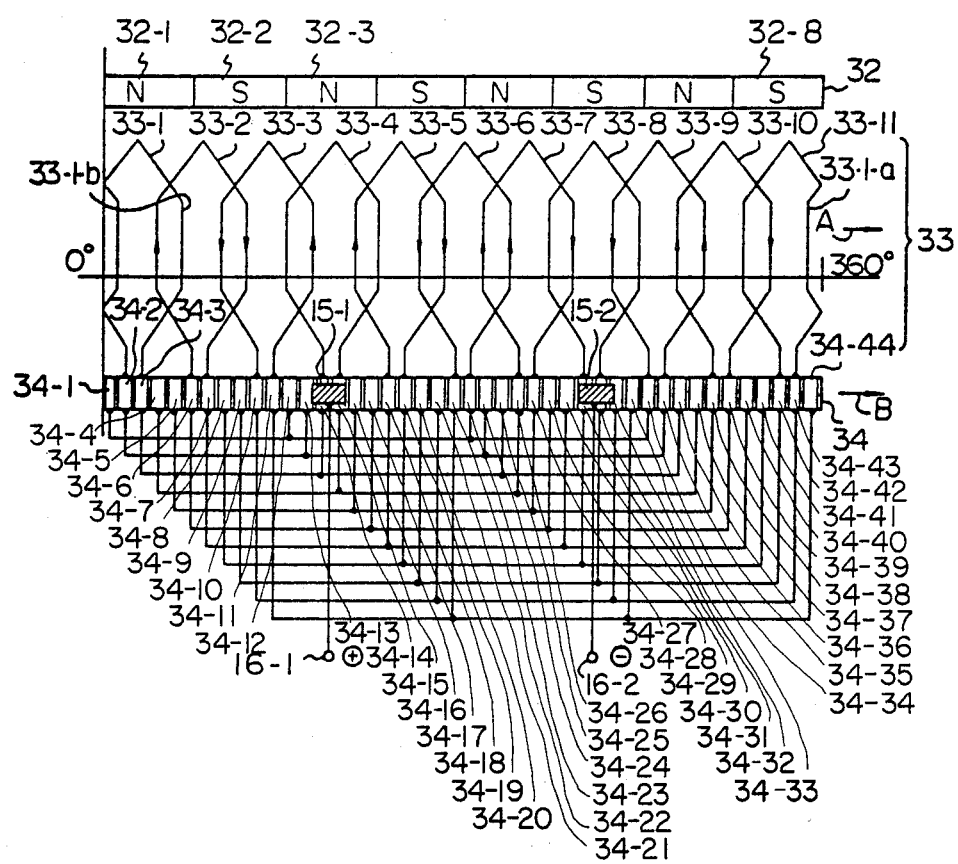
FIG. 11 an expanded view of a further example of field magnet and commutator for use in the commutator motors according to the invention.
Figure 12A:
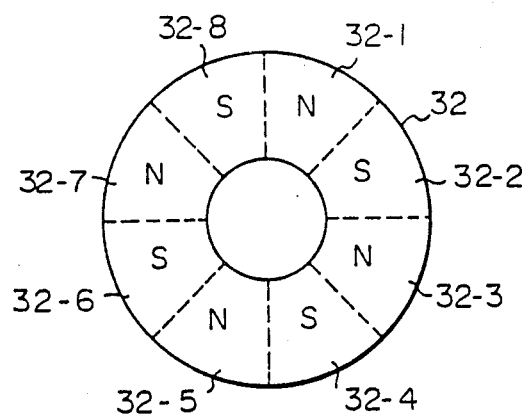
FIG. 12(a) is an explanatory view of the field magnet for use in the example in FIG. 11.

Referring to FIG. 11, there is shown an expanded view of a commutator motor provided with a field magnet with 8 (=2np) magnetic poles and 11 (=n(py−1)) armature coils, where n=1, p=4 and y=3. The field magnet 32 has magnetic poles 32-1, 32-2, ... , and 32-8, magnetized alternately to N and S magnetic poles in the direction of the rotating shaft, with 45-degree angular intervals as shown in FIG. 12(a), which field magnet 32 corresponds to the field magnet 6 as shown in FIG. 1. A commutator 34 comprises 44 (=np(py−1)) commutator segments, 34-1, 34-2, ... , 34-44, which are disposed with about 8.2-degree angular intervals (2/11 the magnetic pole width), and each 4 (=np) separately disposed commutator segments which lie at 90-degree (=360 degrees/np) angular intervals (which is two times the magnetic pole width) are electrically connected to each other. Specifically, the commutator segments 34-1, 34-12, 34-23 and 34-34 are connected to each other through a conductor. Likewise, the commutator segments 34-2, 34-13, 34-24 and 34-35 are connected to each other; the commutator segments 34-3, 34-14, 34-25 and 34-36 are connected to each other; the commutator segments 34-4, 34-15, 34-26 and 34-37 are connected to each other; the commutator segments 34-5, 34-16, 34-27 and 34-38 are connected to each other; the commutator segments 34-6, 34-17, 34-28 and 34-39 are connected to each other; the commutator segments 34-7, 34-18, 34-29 and 34-40 are connected to each other; the commutator segments 34-8, 34-19, 34-30 and 34-41 are connected to each other; the commutator segments 34-9, 34-20, 34-31 and 34-42 are connected to each other; the commutator segments 34-10, 34-21, 34-32 and 34-43 are connected to each other; the commutator segments 34-11, 34-22, 34-33 and 34-44 are connected to each other.

Figure 12B:
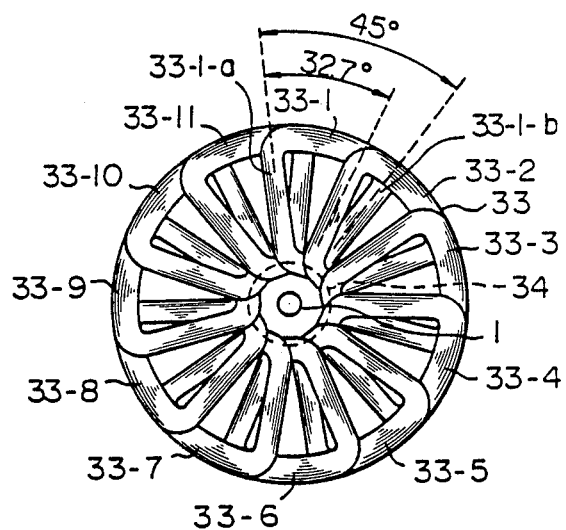
FIG. 12(b) is an explanatory view of armatures for use in the examples in FIG. 11.

As shown in FIG. 12(b), the armature 33 comprises armature coils 33-1, 33-2, ... , and 33-11 which are arranged with an equal pitch, partly overlapping on each other, with about 32.7 degrees angular intervals (8/11 the magnetic pole width). The angular intervals of the conductive portions which contribute to the generation of torque in the armature coils (in the case of the armature coil 33-1, its conductive portions are 33-1-a and 33-1-b) are 45 degrees and equal to the magnetic pole width. The armature 33 corresponds to the armatue 7 shown in FIG. 1.

Referring back to FIG. 11, one end of the armature coil 33-1 is connected to the commutator segment 34-2 and the other end of the same is connected to the commutator segment 34-3. Likewise, one end of the armature coil 33-2 is connected to the commutator segment 34-6 and the other end of the same is connected to the commutator segment 34-7, and one end of the armature coil 33-3 is connected to the commutator segment 34-10 and the other end of the same is connected to the commutator segment 34-11, and one end of the armature coil 33-4 is connected to the commutator segment 34-14, and the other end of the same is connected to the commutator segment 34-15, and one end of the armature coil 33-5 is connected to the commutator segment 34-18 and the other end of the same is connected to the commutator segment 34-19, and one end of the armature coil 33-6 is connected to the commutator segment 34-22 and the other end of the same is connected to the commutator segment 34-23, and one end of the armature coil 33-7 is connected to the commutator segment 34-26 and the other end of the same is connected to the commutator segment 34-27, and one end of the armature coil 33-8 is connected to the commutator segment 34-30 and the other end of the same is connected to the commutator segment 34-31, and one end of the armature coil 33-9 is connected to the commutator segment 34-34 and the other end of the same is connected to the commutator segme 34-35, and one end of the armature coil 33-10 is connected to the commutator segment 34-38 and the other end of the same is connected to the commutator segment 34-39, and one end of the armature coil 33-11 is connected to the commutator segment 34-42 and the other end of the same is connected to the commutator segment 34-43. The angular intervals of brushes 15-1 and 15-2 are 135 degrees (3/1 the magnetic pole width). Those angular intervals are equivalent to 45 degrees ((=360/2np)angular intervals (equal to the magnetic pole width), to 225 degrees angular intervals and to 315-degree angular width.

In the configuration shown in FIG. 11, when electric current flows in the direction of the arrow and torque is generated in each armature coil, the armature 33 and the commutator 34 are rotated in the directions of the arrow A and the arrow B, respectively.

Thus, the switching of the armature current (that is, commutating) is done 88 (=2np(py−1)) times per one rotation (except the specific point) and the motor is rotated by successive generation of torque.

Figure 15:
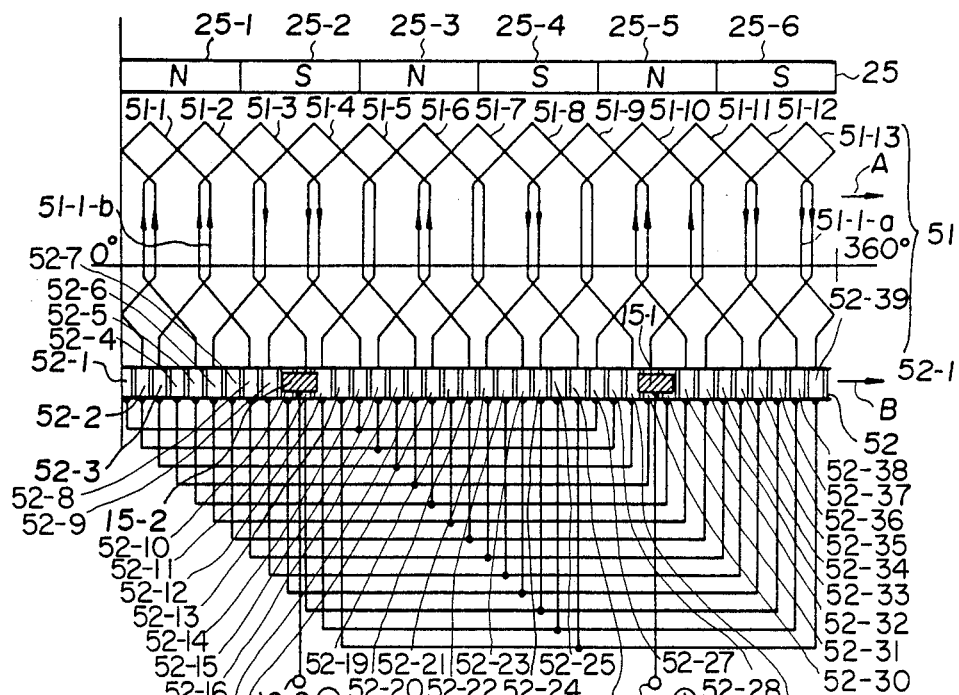
FIGS. 15-16 are expanded views of further examples of the field magnet and commutator for use in the commutator motors according to the present invention.
Figure 17A:
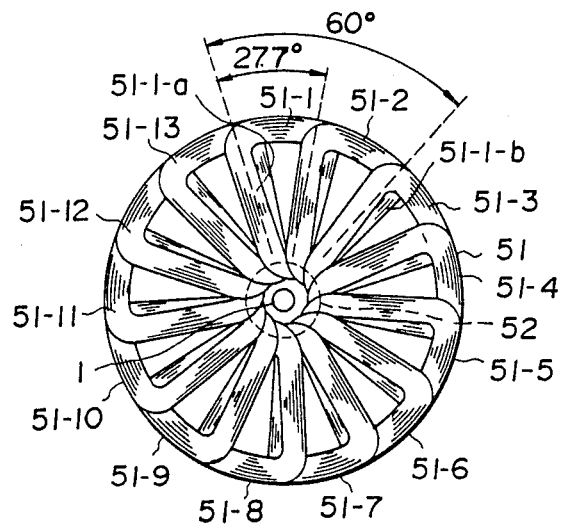
FIGS. 17(a) and (b) explanatory views of armatures for use in the examples in FIGS. 15 and 16, respectively.

Referring to FIG. 15 there is shown an expanded view of a commutator motor provided with a field magnet with 6 (2np) magnetic poles and 13 (n(py+1)) armature coils, where n=1, p=3, y=4. A commutator 52 is composed of 39 (np(py+1)) commutator segments 52-1, 52-3, . . . , 52-39 disposed at angular intervals of about 9.2 degrees (2/13 of magnetic pole width) and each three (np) separately disposed commutator segments which lie at 120 degree (360 degrees/np) angular intervals (which is twice the magnetic pole width) are electrically connected with each other. Namely, the commutator segments 52-1, 52-14, 52-27, the commutator segments 52-2, 52-15, 52-28, the commutator segments 52-3, 52-16, 52-29, the commutator segments 52-4, 52-17, 52-30, the commutator segments 52-5, 52-18, 52-31, the commutator segments 52-6, 52-19, 52-32, the commutator segments 52-7, 52-20, 52-33, the commutator segments 52-8, 52-21, 52-34, the commutator segments 52-9, 52-22, 52-35, the commutator segments 52-10, 52-23, 52-36, the commutator segments 52-11, 52-24, 52-37, the commutator segments 52-12, 52-25, 52-38 and the commutator segments 52-13, 52-26, 52-39 are connected respectively with conductors. As shown in FIG. 17(a), the armature 51 is provided with such a structure that the armature coils 51-1, 51-2, . . . , 51-13 are disposed with an equal pitch, namely with an angular interval of about 27.3 degrees (6/13 of magnetic pole width) allowing a partial overlapping. The conductors which contribute to generation of torque on the armature coil (51-1-a, 51-1-b in the case of armature coil 51-1) are arranged with an angular interval of 60 degrees which is equal to the magnetic pole width and corresponds to an armature 7 shown in FIG. 1. Here, with respect to FIG. 15, the one end of armature coil 52-1 is connected to the commutator segment 52-2 and the other end to the commutator segment 52-3. In the same way, both ends of the armature coil 51-2 are respectively connected to the commutator segments 52-5 and 52-6, both ends of armature coil 51-3 to the commutator segments 52-8 and 52-9, both ends of armature coil 51-4 to the commutator segments 52-11 and 52-12, both ends of armature coil 51-5 to the commutator segments 52-14, 52-15, both ends of armature coil 51-6 to the commutator segments 52-17 and 52-18, both ends of armature coil 51-7 to the commutator segments 52-20 and 52-21, both ends of armature coil 51-8 to the commutator segments 52-23 and 52-24, both ends of armature coil 51-9 to the commutator segments 52-26 and 52-27, both ends of armature coil 51-10 to the commutator segments 52-29 and 52-30, both ends of armature coil 51-11 to the commutator segments 52-32 and 52-33, both ends of armature coil 51-12 to the commutator segments 52-35 and 52-36 and both ends of armature coil 51-13 to the commutator segments 52-38 and 52-39, respectively. An angular interval of brushes 15-1, 15-2 is 180 degrees (3/1 of the magnetic pole width) but it is equivalent to 60 degrees (360/2np, equal to the magnetic pole width) or 300 degrees. In such an positional relation as shown in the figure, power is supplied in the direction indicated by the arrow. Thereby, torques are generated in the respective armature coils and the armatures 51 and 52 rotate respectively in the directions indicated by the arrows A and B. Switching of armature current (rectification) is carried out at the rate of 78 times (2np(py+1)) per rotation and rotation is continued by the successive generation of torque.

Figure 16:
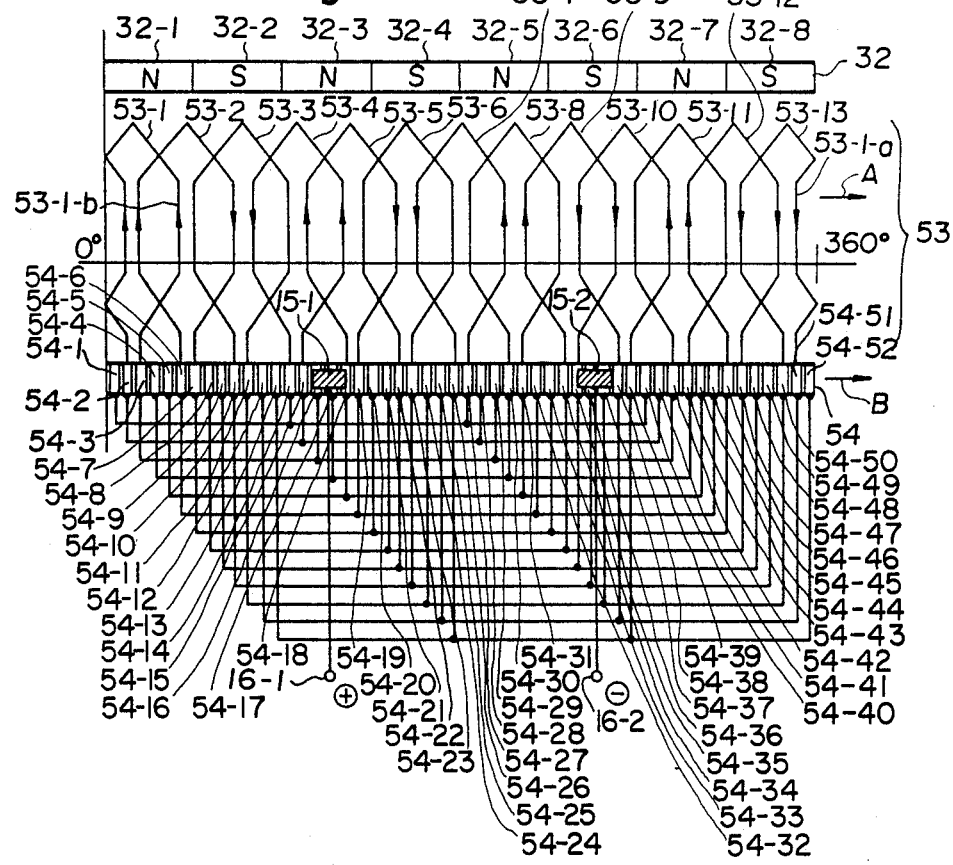
Figure 17B:
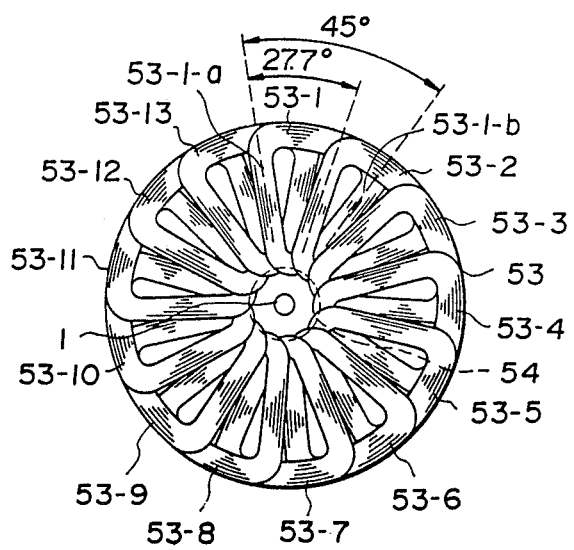

FIG. 16 is an expanded view of a commutator motor provided with a field magnet with 8 (2np) magnetic poles and 13 (n(py+1)) armature coils, where n=1, p=4, y=3. A field magnetic pole 32 is composed of magnetic poles of 32-1, 32-2, . . . , 32-8 which are magnetized to N and S poles in the rotating direction with an angular interval of 45 degrees as shown in FIG. 12(a) and corresponds to the six field magnetic poles shown in FIG. 1. The commutator 54 is composed of 52 (np(py+1)) commutator segments 54-1, 54-2, . . . , 54-52 arranged with an angular interval of about 6.9 degrees (2/13 of magnetic pole width). Groups of four separately disposed commutator segments (np) arranged with an angular interval (360/np=90 degrees which is equal to twice the magnetic pole width) are electrically connected. Namely, the commutator segments 54-1, 54-14, 54-27, 54-40, the commutator segments 54-2, 54-15, 54-28, 54-41, the commutator segments 54-3, 54-16, 54-29, 54-42, the commutator segments 54-4, 54-17, 54-30, 54-43, the commutator segments 54-5, 54-18, 54-31, 54-44, the commutator segments 54-6, 54-19, 54-32, 54-45, the commutator segments 54-7, 54-20, 54-33, 54-46, the commutator segments 54-8, 54-21, 54-34, 54-47, the commutator segments 54-9, 54-22, 54-35, 54-48, the commutator segments 54-10, 54-23, 54-36, 54-49, the commutator segments 54-11, 54-24, 54-37, 54-50, the commutator segments 54-12, 54-25, 54-38, 54-51, and the commutator segments 54-13, 54-26, 54-39, 54-52 are respectively connected with conductors. As shown in FIG. 17(b), an armature 53 is composed of armature coils 53-1, 53-2, . . . , 53-13 arranged with equal pitch, namely an angular interval of about 27.7 degrees (8/13 of magnetic pole width), allowing partial overlapping. An angular interval of the conductors (53-1-a, 53-1-b in the case of the armature coil of 53-1) which contribute to generation of torque on the armature coil is 45 degrees which is equal to magnetic pole width, and it corresponds to an armature 7 in FIG. 7.

Referring back to FIG. 16, the one end of armature coil 53-1 is connected to the commutator segment 54-2, and the other end to the commutator segment 54-3. In the same way, the ends of armature coil 53-2 to the commutator segments 54-6 and 54-7, the ends of armature coil 53-3 to the commutator segments 54-10 and 54-11, the ends of armature coil 53-4 to the commutator segments 54-14 and 54-15, the ends of armature coil 53-5 to the commutator segments 54-18 and 54-19, the ends of armature coil 53-6 to the commutator segments 54-22 and 54-23, the ends of armature coil 53-7 to the commutator segments 54-26 and 54-27, the ends of armature coil 53-8 to the commutator segments 54-30 and 54-31, the ends of armature coil 53-9 to the commutator segments 54-34 and 54-35, the ends of armature coil 53-10 to the commutator segments 53-38 and 53-39, the ends of armature coil 53-11 to the commutator segments 53-42 and 53-43, the ends of armature coil 53-12 to the commutator segments 53-46 and 53-47, and the ends of armature coil 53-13 to the commutator segments 54-50 and 54-51 respectively. An angular interval of brushes 15-1, 15-2 is 135 degrees (3/1 of magnetic pole width), and it is equivalent to 45 degrees (360/2np magnetic pole width) or 225 degrees or 315 degrees. In the positional relation shown in the figure, power is supplied in the direction indicated by the arrow. When torque is generated on the respective armature coils, the armature 53 and commutator 54 rotate respectively in the directions indicated by the arrows A and B. Thereby, switching of armature current (rectification) is carried out at the rate of 104 times (2np(py+1)) (except for the singular point) during a single rotation. The torque is successively generated and thereby rotation is continued.

Figure 13:
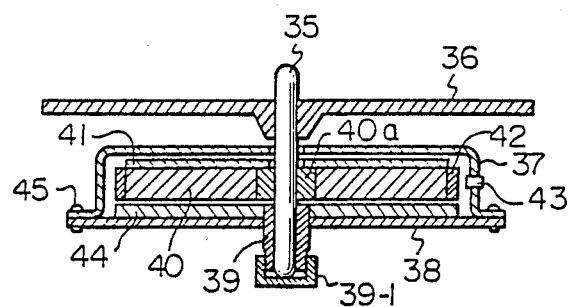
FIG. 13 is an explanatory cross-sectional view of a semiconductor motor to which the present invention is applied.

Referring to FIG. 13, there is shown a cross-sectional view of a semiconductor motor provided with a disc-shaped armature. In the figure, a bearing 39 is fixed to a casing 38 made of press-formed soft steel. Further, a casing 37 made of press-formed soft steel is secured to the casing 38 by screws 45. A rotating shaft 35 for supporting a turntable 36 is rotatably supported by the bearing 39. To the rotating shaft 35 is fixed a magnet rotor 40 through a magnet holder 40a. Around the outer peripheral surface of the magnet rotor 40, there is fixed a ring-shaped position sensing indication band 42. The magnet rotor 40, which serves as a field magnet, is magnetized to magnetic poles N and S located in the axial direction of the rotating shaft 35. A disc member 41 of soft steel, forming a magnetic circuit, is attached to the upper surface of the magnet rotor 40. An armature 44 is attached to the inner surface of the casing 38. Reference numeral 43 indicates a support member for a position sensor, which support member 43 is held in a vacant portion formed in the casing 37. In an outer peripheral lower portion of the bearing 39, there is formed a screw portion in which the rotating shaft 35 is screwed through an internal thread 39-1, so that the position of the rotating shaft 39 can be adjusted in the thrust direction.

Figure 14:
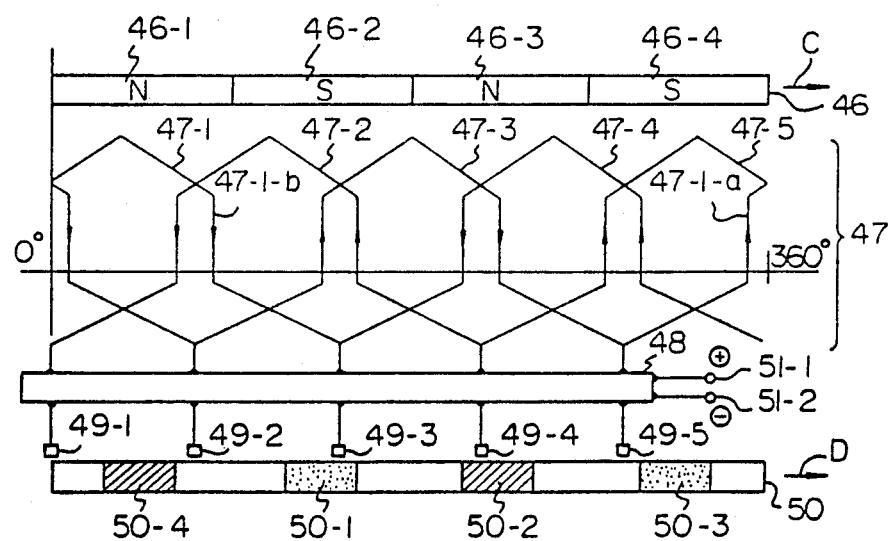
FIG. 14 is an expanded view of the armature coils, magnet rotor of the semiconductor motor as shown in FIG. 11.

Referring to FIG. 14, a semiconductor motor provided with the above-described disc-shaped armature, to which the present invention is applied, will now be explained.

FIG. 14 is an expanded view of the motor provided with a field magnet with 4 ($=2np$) magnetic poles and 5 ($=n(py-1)$) armature coils, where $n=1$, $p=2$ and $y=3$. A magnet rotor 46, which serves as the field magnet, has magnetic poles 46-1, 46-2, 46-3 and 46-4, magnetized to N and S magnetic poles in the direction of the rotating shaft, with 90 degree angular intervals, and is rotated in the direction of the arrow C, which magnet rotor 46 corresponds to the magnetic rotor 40 as shown in FIG. 13. An armature 47 comprises armature coils 47-1, 47-2, 47-3, 47-4 and 47-5 which are arranged with an equal pitch, partly overlapping on each other, with 72-degree angular intervals (4/5 the magnetic pole width). The angular intervals of the conductive portions which contribute to the generation of torque in the armature coils (in the case of the armature coil 47-1, its conductive portions are 47-1-a and 47-1-b) are 90 degrees and equal to the magnetic pole width. The armature 47 corresponds to the armature 44 shown in FIG. 13. Those armature coils are connected in series with each other. The respective connection portions of the armature coils 47-1 and 47-4, the armature coils 47-4 and 47-2, the armature coils 47-2 and 47-5, the armature coils 47-5 and 47-3, and of the armature coils 47-3 and 47-1 are connected to DC power source positive pole 51-1 and DC power source negative pole 51-2 through a power supply control circuit 48 which is commonly used as power supply control apparatus. Reference numerals 49-1, 49-2, 49-3, 49-4 and 49-5 indicate position sensor. As the position sensors, for instance, Hall devices, induction coils or the like can be employed. The angular intervals of the position sensors are 72 degrees, corresponding to 4/5 the magnetic pole width. The position sensors 49-1, 49-2, 49-3, 49-4 and 49-5 are held in the support member 43 as shown in FIG. 13 and are directed towards a position sensing indication band 42. When the position sensing indication band 42 is at the magnetic poles, the outward leaked magnetic flux of the magnetic poles 46-1, 46-2, 46-3 and 46-4 of the magnetic rotor 46 can be utilized. Reference numeral 50 indicates a position sensing indication band including an S pole shown by dotted portions 50-1 and 50-3 and an N pole shown by shaded portions 50-2 and 50-4, which position sensing indication band 50 corresponds to the position sensing indication band 42 as shown in FIG. 13. By the output of the Hall devices 49-1, 49-2, 49-3, 49-4 and 49-5, which are positioned so as to face the N pole, the transistor and others of the first group contained in the power supply control circuit 50 are made conductive, so that the armature coils facing the DC power source positive pole 51-1 is made conductive. Furthermore, by the output of the Hall devices 49-1, 49-2, 49-3, 49-4 and 49-5, the transistor and others of the second group contained in the power supply control circuit 50 are made conductive, so that the armature coils facing the DC power source negative pole 51-2 is made conductive. By the above-mentioned conduction, the armature current is controlled.

In the configuration as shown in FIG. 14, by the output of the Hall device 49-4 which faces the N pole, its counterpart transistor in the first group is made conductive, so that the connecting portion of the DC power source positive pole 51-1 and the armature coils 47-2 and 47-5 is made conductive. Furthermore, by the output of the Hall device 49-3 which faces the S pole, its counterpart transistor in the second group is made conductive, so that the connecting portion of the DC power source negative pole 51-2 and the armature coils 47-1 and 47-4 is made conductive. As a result, electric current flows in the direction of the arrow and torque is generated in each armature coil, so that the magnetic rotor 46 and the position sensing indication band 50 are respectively rotated in the direction of the arrows C and D. Thus, the switching of the armature current (that is, commutating) is done 20 (=2np(py−1)) times per one rotation and the motor is rotated with successive generation of torque. Since this conduction system is the same as that of the conventional semiconductor motors, in the above-mentioned semiconductor motor, the magnetic rotor 46 and the position sensing indication band 50 are respectively rotated in the directions of the arrows C and D. In the above-mentioned embodiment, there are provided the field magnet with four magnetic poles and five armature coils. The present invention is not limited to that embodiment, but can be applied to other semiconductor motors.

In all the above-described embodiments of a DC motor according to the present invention, the present invention is applied to the disc-shaped armatures. As a matter of course, the present invention can be applied to cylindrical armatures and core armatures as well.

Furthermore, the object of the present invention can be attained in the motors provided with n(py+1) armature coils with 2np magnetic poles. Therefore, in addition to the above-described embodiments, the present invention can be applied, for instance, to the following embodiments: In the case of 4 magnetic poles, motors with 9, 11, 14, 16, ..., armature coils; in the case of 6 magnetic poles, motors with 13, 14, 16, ..., armature coils; in the case of 8 magnetic poles, motors with 13, 15, 17, ..., armature coils; in the case of 10 magnetic poles, motors with 14, 16, 19, ..., armature coils. Although, in all of the above-described embodiments, n=1, the present invention is not limited to that case. According to the present invention, when the number of armature coils are increased to n times the number of the magnetic poles and the number of armature coils adopted in the above-described embodiments (where n is an integer more than 1), DC motors with high torque and high efficiency and excellent commutating characteristics, with all the armature coils disposed with an equal pitch and the armature reduced in thickness.

Thus, there is provided in accordance with the present invention a DC motor which has the advantages discussed above. The embodiments described are intended to be merely exemplary and those skilled in the art will be able to make variations and modifications in them without departing from the spirit and scope of the invention. All such modifications and variations are contemplated as falling within the scope of the claims.

What is claimed is:

1. A direct current motor comprising:
   a field magnet with 2np magnetic poles, magnetized to N and S poles with equal angular intervals, where n is an integer of 1 or more and p is an interger of 2 or more:
   a magnetic member for closing the magnetic circuit of said magnetic poles of said field magnet;
   n(p+1) armature coils disposed in such a manner that the angular intervals of the electrically conductive portions of said armature coils, are substantially equal to the magnetic pole width of said field magnet, where y is an integer of 3 or more but 4 or more when p=2;
   a wave-winding-type armature on which said armature coils are disposed, overlapping on each other, with an equal pitch, said wave-winding-type armature being directed towards said field magnet within said magnetic circuit;
   electric power supply control means for current-changing the armature current np(py±1) times or times per one rotation of one of said armature and said magnet; and
   a rotating shaft for rotatably supporting said wave-winding-type armature to said field magnet, said rotating shaft being rotatably supported by bearings mounted on an outer casing of said motor.

2. A direct current motor comprising:
   a field magnet with 2np magnetic poles, magnetized to N and S poles with equal angular intervals, where n is an integer of 1 or more and p is an integer of 2 or more:
   a magnetic member for closing the magnetic circuit of said magnetic poles of said field magnet;
   n(py±1) armature coils disposed in such a manner that the angular intervals of the electrically conductive portions of said armature coils, are substantially equal to the magnetic pole width of said field magnet, where y is an integer of 3 or more but 4 or more when p=2;
   a wave-winding-type armature on which said armature coils are disposed, overlapping on each other, with an equal pitch, said wave-winding-type armature being directed towards said field magnet within said magnetic circuit;
   electric power supply control means for current-changing the armature current 2np(py±1) times per one rotation of one of said armature and said magnet; and
   a rotating shaft for rotatably supporting said wave-winding-type armature to said field magnet, said rotating shaft being rotatably supported by bearings mounted on an outer casing of said motor.

* * * * *

UNITED STATES PATENT AND TRADEMARK OFFICE
CERTIFICATE OF CORRECTION

PATENT NO. : 4,583,016
DATED : April 15, 1986
INVENTOR(S) : Itsuki Ban, Manabu Shiraki and Kazuhito Egami It is certified that error appears in the above-identified patent and that said Letters Patent are hereby corrected as shown below:

Claim 1, col. 16, line 15, change "$n(p+1)$" to --$n(py\pm1)$--.

Signed and Sealed this

Twenty-ninth Day of July 1986

[SEAL]

Attest:

DONALD J. QUIGG

Attesting Officer

Commissioner of Patents and Trademarks